United States Patent
Bae et al.

(10) Patent No.: US 9,071,466 B2
(45) Date of Patent: Jun. 30, 2015

(54) APPARATUS AND METHOD FOR CALL HANDOVER BETWEEN PACKET NETWORK SYSTEM AND CIRCUIT NETWORK SYSTEM

(75) Inventors: Eun-Hui Bae, Seoul (KR); Sung-Ho Choi, Suwon-si (KR); Jai-Yong Lee, Seoul (KR); Hyun-Duk Jung, Seoul (KR); Kyung-Min Kim, Seoul (KR)

(73) Assignees: Samsung Electronics Co., Ltd. (KR); Industry-Academic Cooperation Foundation, Yonsei University (KR)

( * ) Notice: Subject to any disclaimer, the term of this patent is extended or adjusted under 35 U.S.C. 154(b) by 1307 days.

(21) Appl. No.: 12/124,321

(22) Filed: May 21, 2008

(65) Prior Publication Data

US 2009/0005048 A1   Jan. 1, 2009

(30) Foreign Application Priority Data

May 21, 2007  (KR) .................. 10-2007-0049411

(51) Int. Cl.
*H04W 4/00* (2009.01)
*H04W 36/14* (2009.01)
*H04L 12/66* (2006.01)
*H04L 12/46* (2006.01)
*H04W 8/02* (2009.01)
*H04L 29/06* (2006.01)
*H04J 11/00* (2006.01)
*H04W 92/14* (2009.01)

(52) U.S. Cl.
CPC ............. *H04L 12/66* (2013.01); *H04J 11/0093* (2013.01); *H04L 12/4633* (2013.01); *H04W 4/00* (2013.01); *H04W 8/02* (2013.01); *H04W 36/14* (2013.01); *H04W 92/14* (2013.01); *H04L 69/08* (2013.01)

(58) Field of Classification Search
CPC ....... H04W 8/02; H04W 36/14; H04W 92/14; H04W 4/00
USPC .................. 370/352, 354, 331; 455/442, 436
See application file for complete search history.

(56) References Cited

U.S. PATENT DOCUMENTS

| | | | |
|---|---|---|---|
| 6,721,565 B1 * | 4/2004 | Ejzak et al. | 455/436 |
| 7,295,843 B2 * | 11/2007 | Ejzak et al. | 455/442 |
| 7,522,585 B2 * | 4/2009 | Liu et al. | 370/354 |
| 2006/0256752 A1 * | 11/2006 | Svensson et al. | 370/331 |
| 2006/0268781 A1 * | 11/2006 | Svensson et al. | 370/331 |
| 2007/0014281 A1 * | 1/2007 | Kant | 370/352 |
| 2007/0058791 A1 | 3/2007 | Liu et al. | |
| 2007/0213060 A1 * | 9/2007 | Shaheen | 455/436 |
| 2007/0291695 A1 * | 12/2007 | Sammour et al. | 370/331 |

FOREIGN PATENT DOCUMENTS

| | | |
|---|---|---|
| KR | 1020060068416 | 6/2006 |
| WO | WO 01/82551 | 11/2001 |

* cited by examiner

*Primary Examiner* — Ariel Balaoing
(74) *Attorney, Agent, or Firm* — The Farrell Law Firm, P.C.

(57) ABSTRACT

A method and apparatus for performing handover on a voice call between a packet network system and a circuit network system is provided. Considering a communication environment where a UE cannot simultaneously use radio resources of both the next generation mobile communication system (LTE) and the legacy mobile communication system (e.g., GSM/WCDMA), the present invention proposes an SCSE for performing signal translation between the packet switched network and the circuit switched network and anchoring a voice call in the application level, and supports a continuous voice call using the SCSE.

22 Claims, 8 Drawing Sheets

APPARATUS AND METHOD FOR CALL HANDOVER BETWEEN PACKET NETWORK SYSTEM AND CIRCUIT NETWORK SYSTEM

BACKGROUND OF THE INVENTION

1. Field of the Invention

The present invention provides an apparatus and method for performing call handover between a packet network system and a circuit network system.

2. Description of the Related Art

The circuit network system refers to a system that uses a scheme of assigning a fixed call circuit between users intending to enjoy a voice call, such as Global System for Mobile communication/Wideband Code Division Multiple Access Circuit Switch (GSM/WCDMA CS). The users are assumed to use a Circuit Switched (CS) scheme over the GSM/WCDMA system for a voice service.

The Long Term Evolution (LTE) system, a packet network system applied in the present invention, is a system that uses a Packet Switched (PS) scheme, which is the next generation mobile communication system evolved based on Universal Mobile Telecommunication Service (UMTS). That is, the LTE system provides a voice call or Voice over IP (VoIP) service using Internet Protocol Multimedia Subsystem (IMS) for a voice service. IMS provides communication through an unfixed path using an Internet Protocol (IP) packet, and a VoIP message is transmitted through an IMS session.

An Application Server (AS) of IMS anchors both a VoIP call and a CS call occurring in the LTE system network and the CS system. That is, for the CS call, a Mobile Service switching Center (MSC) acquires a routing address to an IMS network through a Customized Applications for Mobile Network Enhanced Logic (CAMEL) process, and it is delivered to a Media Gateway Control Function (MGCF) of the IMS network using an Integrated Services Digital Network User Part (ISUP) Initial Address Message (IAM) message. The IAM message delivered to MGCF is translated into a Session Initiation Protocol (SIP) INVITE Request and delivered to an Application Server (AS) via a Serving (S)-Call Session Control Server (CSCF). Upon receipt of the SIP INVITE Request, the AS stores information on the corresponding CS call, and delivers a SIP INVITE Request to a receiving side based on the received SIP INVITE Request message to connect a call. An SIP INVITE Request that a User Equipment (UE) has transmitted for a VoIP call is delivered to the AS via a Proxy (P)-CSCF and the S-CSCF. The AS, as in the case of the CS call, anchors a corresponding VoIP call, and delivers an SIP INVITE Request to the receiving side to connect a call. Therefore, both the CS call and the LTE VoIP call are controlled in the IMS network.

FIG. 1 is a diagram illustrating the situation where an LTE VoIP call is connected.

Referring to FIG. 1, a control signal 109 for a VoIP call is anchored from a UE for LTE (UE-LTE) 101b to an AS 107 via a P-CSCF 105 and an S-CSCF 106, and then connected again to a receiving side 108 via the S-CSCF 106. In this state, voice data 110 is delivered to a System Architecture Evolution (SAE) Anchor 104 via an Enhanced Node B (ENB) 102 and a User Plane Entity (UPE) 103, and then delivered to the receiving side 108 over the IP network.

FIG. 2 is a diagram illustrating the situation where a CS call is connected.

Referring to FIG. 2, a control signal 209 for a CS call is delivered from a UE for CS (UE-CS) 201a to an S-CSCF 206 via an MSC 203 and an MGCF 204 of an integrated Mobile Management Entity (MME), and the S-CSCF 206 sends this signal to an AS 207 to anchor it therein. Thereafter, the AS 207 sends a control signal to a receiving side 208, completing the call. In this state, voice data 210 is delivered to an SAE Anchor 205 via a Media GateWay (MGW) 202 of the MSC 203 and an MGW 204 of the integrated MME, and then delivered to the receiving side 208 over the IP network.

The UE can support both the GSM/WCDMA network and the LTE network in this way, but it has a restriction in simultaneously accessing the two types of networks. In other words, the UE cannot access the GSM/WCDMA network while communicating with the LTE network, and similarly, the UE cannot access the LTE network while communicating with the GSM/WCDMA network.

Meanwhile, there is 3GPP TS23.206 as a conventional technology for supporting handover between a VoIP call and a CS call. In TS23.206, a call undergoes call anchoring through a Voice Call Continuity (VCC) application which is an AS. However, it is assumed in TS23.206 that the UE can simultaneously access a CS network and a PS network. Therefore, the UE uses the following method in which when there is a request for handover, the UE forms a radio link to another system while maintaining the call of the old system, to generate a new session, and when the generation of the new session is completed, the UE releases the old session and the old radio link. Therefore, such a method cannot be applied when the UE, as assumed herein, cannot simultaneously access different networks.

Therefore, when the UE needs handover to the GSM/WCDMA CS network while receiving the VoIP service over the LTE system, there is a demand for a Radio Access Network (RAN) technique and an IMS session control technique for supporting the handover, and an apparatus for implementing the techniques.

SUMMARY OF THE INVENTION

An aspect of the present invention is to address at least the problems and/or disadvantages and to provide at least the advantages described below. Accordingly, an aspect of the present invention is to provide a handover apparatus and method for providing a seamless continual voice call when a UE cannot simultaneously access an LTE network and a GSM/WCDMA network.

According to one aspect of the present invention, there is provided a method for performing handover from a packet switched call based on a packet switched network to a circuit switched call based on a circuit switched network. The handover method includes receiving a handover request message from a User Equipment (UE) over the packet switched network; when the handover request message is a GPRS Tunneling Protocol (GTP) message, checking if the handover-requesting UE is an anchored UE; and when the handover-requesting UE is an anchored UE, translating the GTP message into a Mobile Application Part (MAP) message, and then delivering the MAP message to the circuit switched network.

According to another aspect of the present invention, there is provided a method for performing handover from a packet switched call based on a packet switched network to a circuit switched call based on a circuit switched network. The handover method includes receiving a handover request message from a User Equipment (UE) over the packet switched network; when the handover request message is a Mobile Application Part (MAP) message, setting up a bearer to the handover-requesting UE, and assigning a circuit switched call routing number for delivering the circuit switched call to the UE; and generating and transmitting a handover response message including the set bearer information and the routing number.

According to further another aspect of the present invention, there is provided an apparatus for performing handover from a packet switched call to a circuit switched call. The handover apparatus includes a packet switched network; a circuit switched network; and a network entity, connected between the packet switched network and the circuit switched network, for receiving a handover request message from a User Equipment (UE) over the packet switched network, and when the handover request message is a GPRS Tunneling Protocol (GTP) message, translating the GTP message into a Mobile Application Part (MAP) message, and then delivering the MAP message to the circuit switched network.

According to yet another aspect of the present invention, there is provided an apparatus for performing handover from a packet switched call based on a packet switched network to a circuit switched call based on a circuit switched network. The handover apparatus includes a Service Continuity Supporting Entity (SCSE), connected between the packet switched network and the circuit switched network, for receiving a handover request message from a User Equipment (UE) over the packet switched network, and when the handover request message is a GPRS Tunneling Protocol (GTP) message, translating the GTP message into a Mobile Application Part (MAP) message and then delivering the MAP message to the circuit switched network; and a Mobile Service switching Center (MSC) for receiving the MAP message from the SCSE, setting up a bearer to the UE, assigning a circuit switched call routing number for delivering the circuit switched call to the UE, generating a handover response message including the set bearer information and the routing number, and transmitting the handover response message to the SCSE.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The present invention provides a network entity for interworking between a packet switched network and a circuit switched network. That is, the present invention proposes to insert a Service Continuity Supporting Entity (SCSE) for handover signal translation between an MME of the LTE system and an MSC of the legacy system.

Figure 1:
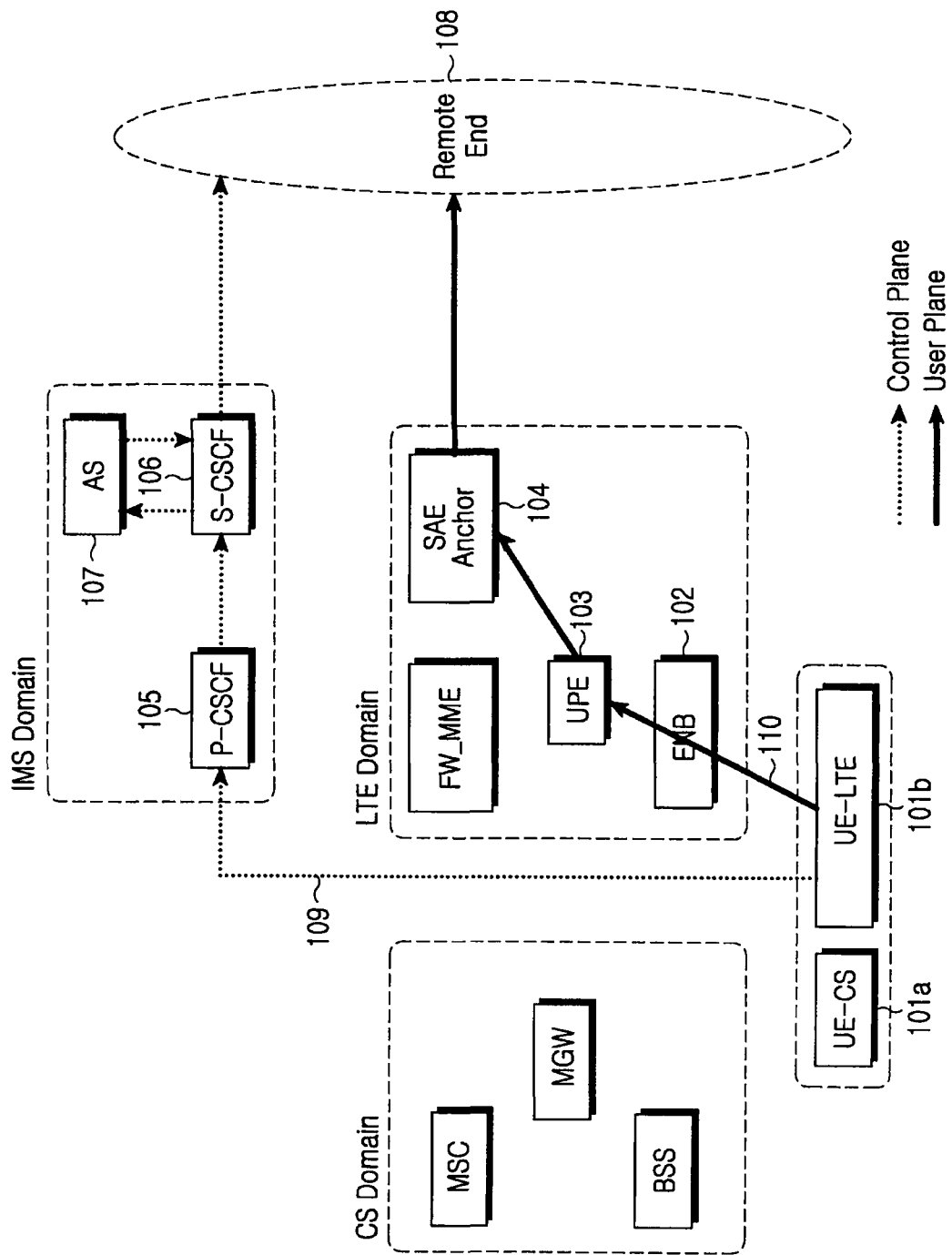
FIG. 1 is a diagram schematically illustrating a system configuration where an LTE VoIP call is connected, to which the present invention is applied.
Figure 2:
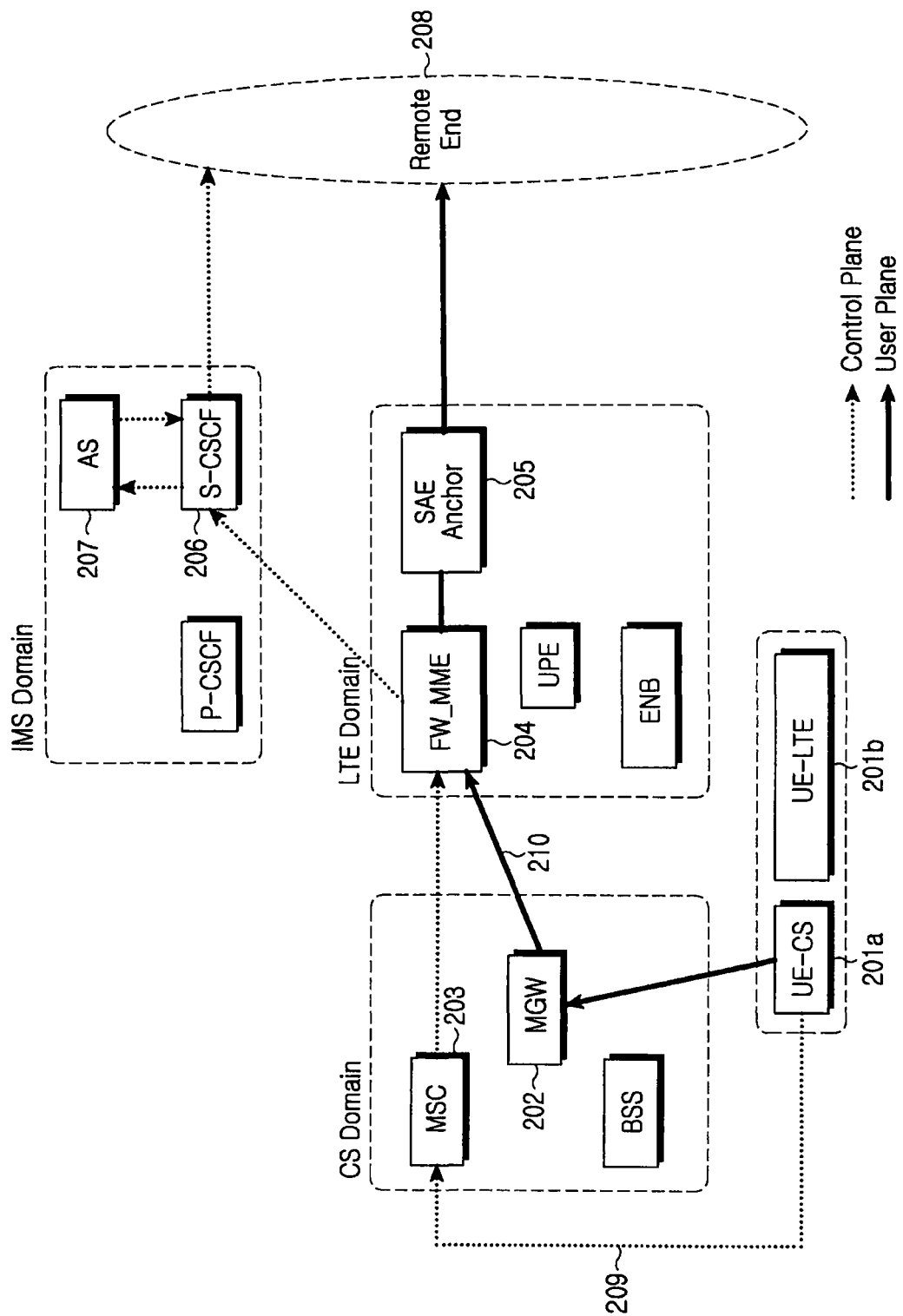
FIG. 2 is a diagram schematically illustrating a system configuration where a CS call is connected, to which the present invention is applied.
Figure 3:
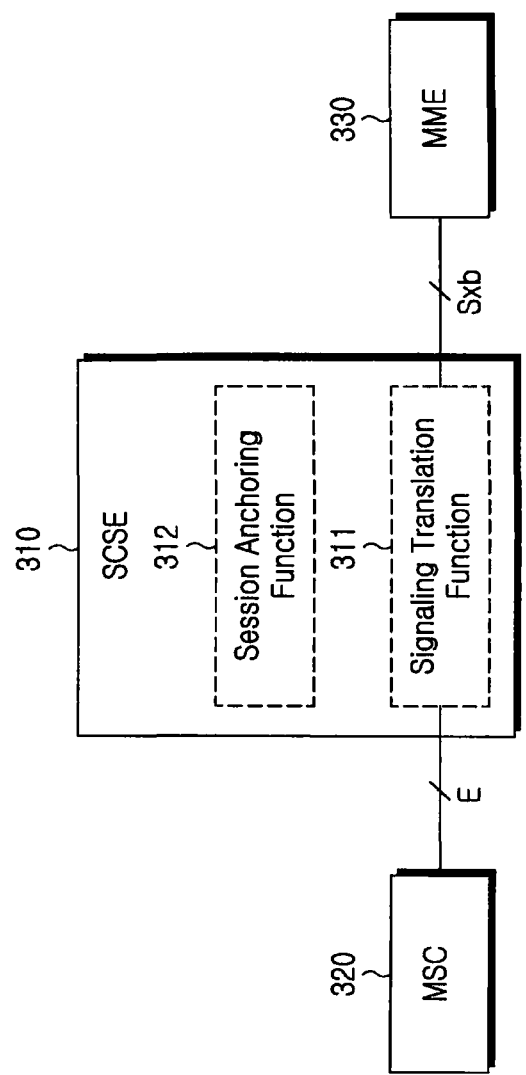
FIG. 3 is a diagram illustrating a structure of an SCSE according to an embodiment of the present invention.

FIG. 3 illustrates a structure of an SCSE according to an embodiment of the present invention.

Referring to FIG. 3, the key function of the SCSE 310 is to translate a signal for information exchange between two systems, when there is a need for call handover between an LTE system (hereinafter referred to as a network using a packet service domain) and a GSM/WCDMA system (hereinafter referred to as a network using a circuit service domain). For this, the SCSE 310 includes a signaling translation function 311. The signaling translation function 311 performs translation between a GPRS Tunnel Protocol Control (GTP-C) message used for handover signaling in the LTE system and a Mobile Application Part (MAP) message used for handover signaling in the GSM/WCDMA system.

In addition, the SCSE 310 serves as an anchor point for the voice call, and for this, it includes a session anchoring function 312. According to the present invention, the LTE VoIP call and GSM/WCDMA CS call are both set to undergo the session anchoring function 312 of the SCSE 310 in their generation processes. The session anchoring function 312 operates as an SIP Back-to-Back User Agent (B2BUA) to manage information on the voice call.

A detailed description will now be made of a call handover method according to an embodiment of the present invention.

Figure 4:
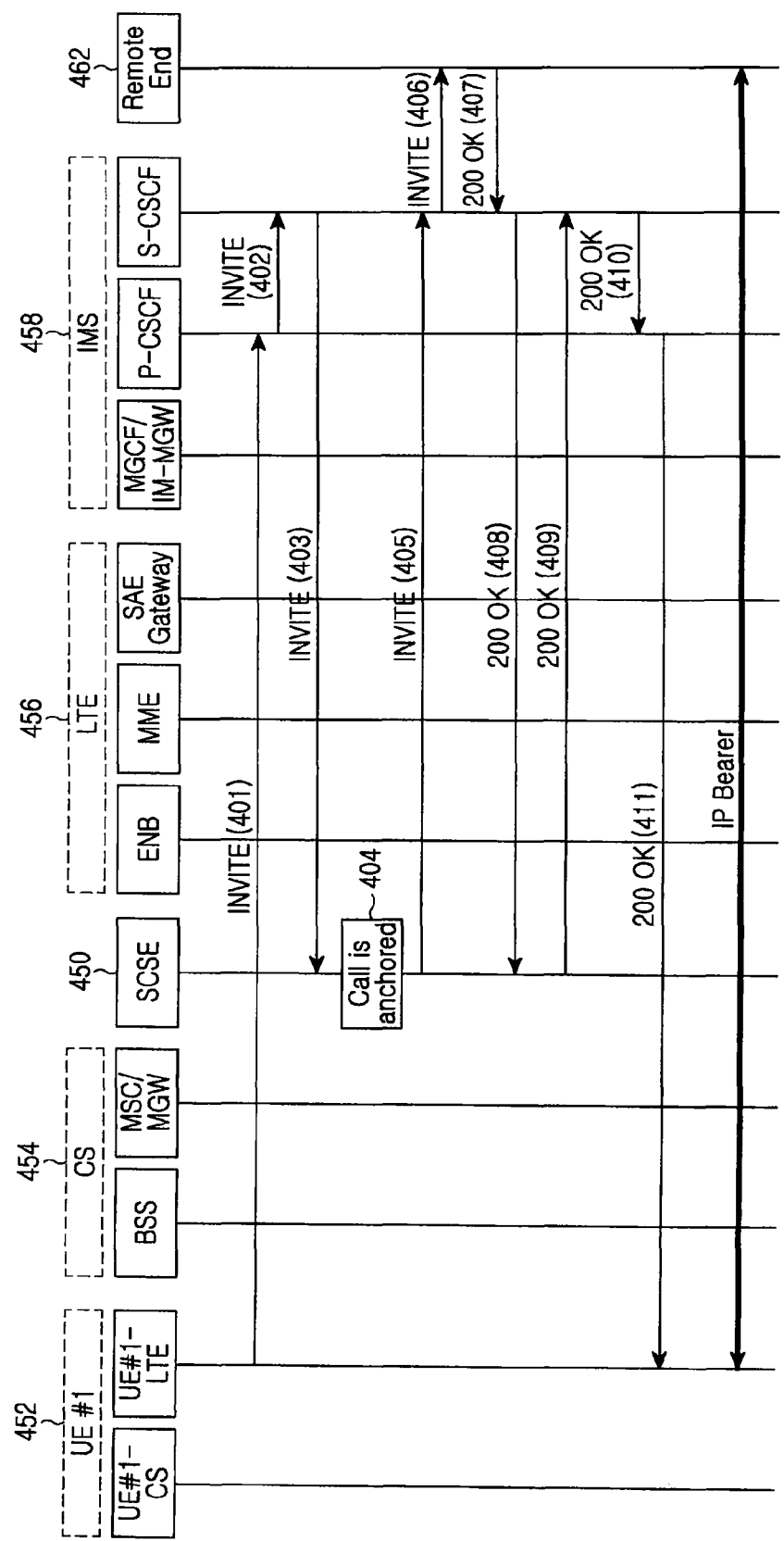
FIG. 4 is a diagram illustrating a process in which a UE supports an LTE VoIP call according to an embodiment of the present invention.

FIG. 4 illustrates a process in which a UE generates a VoIP call over an LTE network according to an embodiment of the present invention. According to the present invention, an LTE VoIP call is anchored in an SCSE 450, and the SCSE 450 serves as an SIP B2BUA for the LTE VoIP call.

The term 'anchoring' as used herein refers to an operation of managing the basic call information for a generated voice call and information on the UE that has requested the call.

Referring to FIG. 4, in step 401, a UE 452 sends INVITE to P-CSCF of an IMS 458 to generate a VoIP call. In step 402, the P-CSCF delivers the INVITE to S-CSCF. In step 403, the S-CSCF checks the INVITE according to initial filter criteria, and then delivers the INVITE to the SCSE 450.

Upon receipt of the INVITE, the SCSE 450 anchors the corresponding session in step 404, and transmits INVITE to the S-CSCF of the IMS 458 to complete the call to a receiving UE 462 in step 405. The S-CSCF delivers the INVITE to the receiving UE 462 in step 406.

In step 407, the receiving UE 462 transmits a 200 OK response message to the S-CSCF in response to the INVITE. In step 408, the S-CSCF delivers the 200 OK to the SCSE 450. In step 409, the SCSE 450 transmits the 200 OK to the S-CSCF in order to deliver the received 200 OK to the transmitting UE 452. The S-CSCF delivers the 200 OK to the P-CSCF in step 410, and the P-CSCF finally delivers the 200

OK to the transmitting UE 452 in step 411, completing the generation of the LTE VoIP call.

Figure 5A:
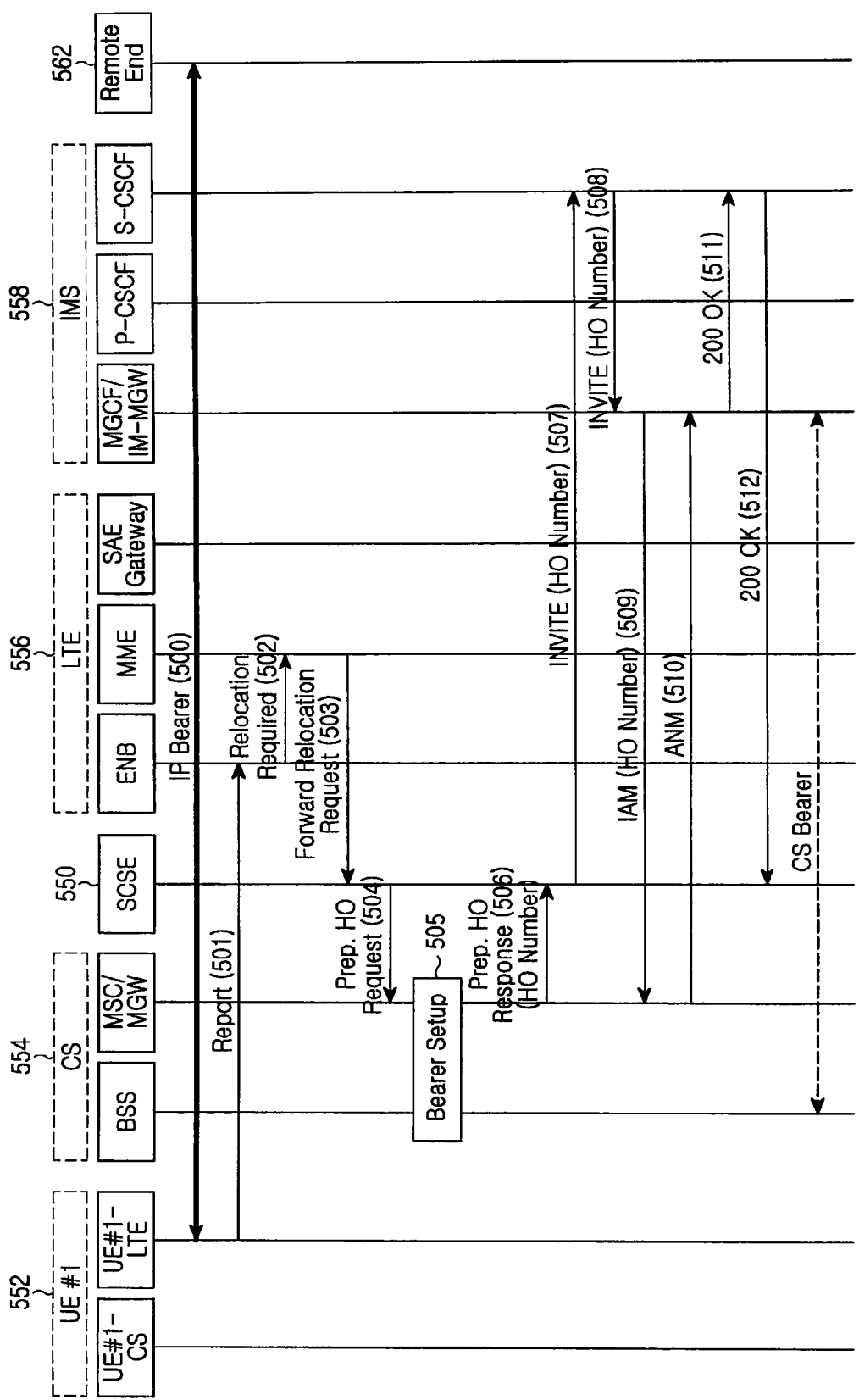
FIG. 5A and FIG. 5B are diagrams illustrating a process in which an SCSE switches an LTE VoIP call to a GSM/WCDMA CS call according to an embodiment of the present invention.
Figure 5B:
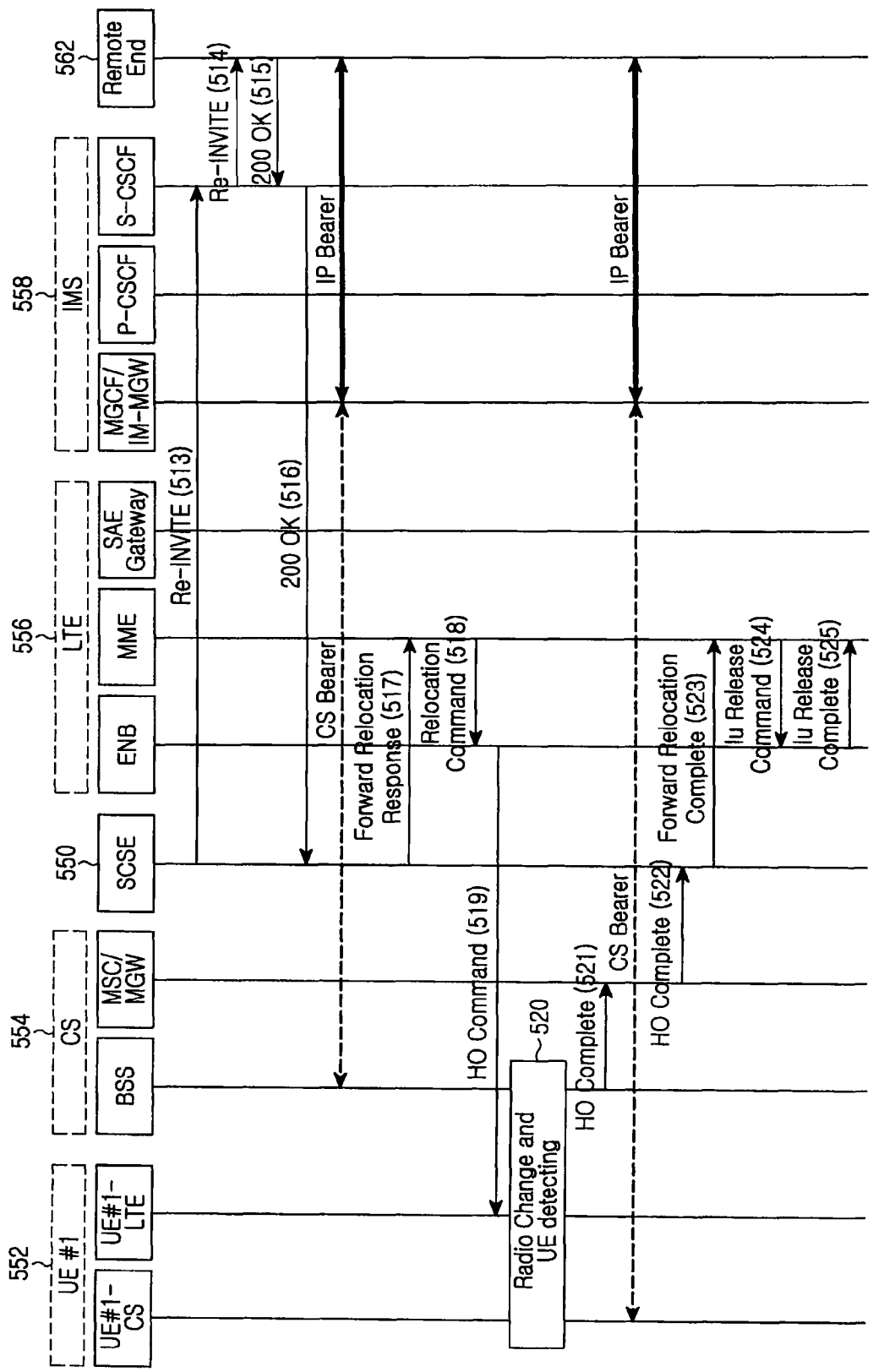

FIG. 5A and FIG. 5B illustrate a process of performing handover from an LTE VoIP call to a GSM/WCDMA CS call using an SCSE according to an embodiment of the present invention.

Referring to FIG. 5A, in step 500, a UE 552 is now performing a voice call with a receiving UE using an LTE VoIP call.

In step 501, the UE 552 transmits a measurement report for its current radio state to an ENB of an LTE network 556 periodically according to a measurement scheme predetermined in the system, or taking occurrence of a particular event into account. The UE, when it is using a voice call, performs measurement on both on the LTE cell and the GSM/WCDMA cell.

The measurement report that the UE transmits in step 501, includes therein information used for detecting information on a target network. This information includes a Cell Global Identity (CGI) of the cells for which the UE has made a measurement. The CGI is composed of Location Area Identity (LAI) and Mobile Country Code (MCC)+Mobile Network Code (MNC)+Location Area Code (LAC))+Cell Identity (CI)+Routing Area Code (RAC). Herein, when the cell where the UE is now located is a cell servicing only CS, CGI includes no RAC.

In step 502, upon receipt of the measurement report from the UE, the ENB determines if there is a need for handover of the UE, and if it is determined that there is a need for handover, the ENB sends a handover request message to an MME. The handover request message includes therein Message Type, Cause Value, Measured Cell Identifier, and Mobility-related Context and Security-related Context information stored for the UE.

In step 503, upon receipt of the handover request message, the MME translates the received handover request message into a GTP message, and forwards it to an SCSE.

In the present invention, the MME analyzes information (e.g., CGI) by which a target cell can be checked, another information by which a target system can be detected, or Indication indicating handover for Signaling Radio Session Continuity, all of which are included in the handover request message, to determine whether it will forward the handover request message to the SCSE. For example, when CGI of a target cell includes no RAC, the MME transmits a handover prepare request message to the SCSE, considering that the requested handover is handover to the cell situated in the GSM/WCDMA network. That is, the MME, after analyzing information included in the handover request message, may determine the request message as a message that should undergo handover to the GSM/WCDMA network, and in the corresponding case, forwards the handover request message to the SCSE.

If the CGI information is no longer used in the LTE network, or if the handover request message includes therein another type of information by which information on the service domain in the target system can be acquired, the present invention includes even the operation of determining a target domain based on the newly defined information.

In the case where the MME has determined to deliver the handover request message to the SCSE, the MME generates a handover prepare request message using a GTP-C protocol, and then delivers it to the SCSE. The handover prepare request message includes therein Identity of a target cell for handover, International Mobile Subscriber Identity (IMSI) of UE, security information (security context), etc.

The SCSE checks if the handover prepare request message is a message scheduled to be delivered to the GSM/WCDMA network, or checks if the corresponding UE is a UE on which it is now performing call anchoring to provide a VCC service. The SCSE can determine if the corresponding message is a message scheduled to be delivered to the GSM/WCDMA network, based on the Cell Identity information in the request message. Meanwhile, when the MME determines if the request message is a message delivered to the GSM/WCDMA network or not, the corresponding of the SCSE can be omitted.

Whether the corresponding UE is performing call anchoring for VCC service can be determined by comparing IMSI information and UE's ID information included in the handover prepare request message with ID information of the UEs that a function unit in the SCSE now in charge of a VCC application function is managing. When the corresponding UE is a UE for the call now anchored by the SCSE, the SCSE translates, in step 504, the protocol-based request message into a MAP-based handover prepare request message, and delivers the translated message to the target MSC using a target cell ID.

In this case, the SCSE checks again if the corresponding UE performing handover is a UE on which call anchoring for VCC is now being performed by the VCC application function of the SCSE. Upon receipt of a handover request for the call that is not undergoing anchoring, the SCSE sends a GTP error response message to the MME.

Upon receipt of the handover prepare request message, the target MSC sets up a bearer to a target Base Station System (BSS) in step 505. The MSC is assigned a handover number for handover in association with a Visitor Location Register (VLR). The handover number, a number in the form of Mobile Subscriber ISDN Number (MSISDN), is a call routing number needed to make a call from the network to the UE.

After completing the bearer setup, the MSC transmits a handover prepare complete message to the SCSE in step 506. In this case, the handover prepare complete message includes the handover number assigned in step 505.

In step 507, the SCSE transmits an INVITE Request message to the S-CSCF in order to set up a new access leg to the UE using the handover number delivered from the MSC. At this point, REQUEST-Uniform Resource Identifier (URI)/To-header of the INVITE is set as the assigned handover number, and From-header is set as the SCSE. In step 508, the S-CSCF delivers the INVITE to the MGCF.

In step 509, the MGCF transmits an ISDN Service User Part (ISUP) IAM message including Called Party Number, Calling Party Number and User Service Information (USI) parameter which is information on the type of the service, to the MSC to which the handover number is assigned.

In step 510, the MSC sends an Answer Message (ANM) to the MGCF in response to the ISUP IAM message. In step 511, the MGCF delivers a 200 OK response to the S-CSCF. In step 512, the S-CSCF delivers the 200 OK response to the SCSE.

In step 530, the UE moves to the GSM/WCDMA network through steps 504 to 512, and then completes the necessary resource setup for the circuit network. That is, when a new access leg is set up between BSS and SCSE, a CS bearer passing from the BSS through MSC/MGW and IM-MGW is set up.

Referring to FIG. 5B, after completing the access leg setup as stated in step 530, the SCSE 550 transmits in step 513 a Re-INVITE to the S-CSCF to update the bearer information of the UE, which is performing handover, with an address of the MGW. In step 514, the S-CSCF delivers the Re-INVITE to the receiving UE 562. In step 515, the receiving UE transmits a 200 OK response to the S-CSCF. In step 516, the S-CSCF delivers a 200 OK to the SCSE 550.

As a result, the session to the receiving UE is updated from the old session to the LTE domain to the newly set session to the CS domain.

In step 517, the SCSE, after completing the session switching, translates the prepare complete message in the form of MAP handover, received from the MSC, into a GTP protocol handover prepare complete message available in the LTE network, and delivers it to the MME. In step 518, the MME delivers a handover command to the ENB to notify the UE of the execution of handover. In step 519, the ENB delivers the handover command to the UE. The handover command includes therein information on the target network to which the UE should move.

In step 520, upon receipt of the handover command, the UE switches the old radio link connected to the LTE network to the GSM/WCDMA network, accesses the GSM/WCDMA network, and performs a process of setting up a radio connection. Therefore, the target BSS perceives the access by the UE.

In step 521, upon detecting the handover of the UE, the BSS transmits a handover complete message to the MSC, thereby resuming the voice service to the UE using the previously set radio bearer and CS access leg information. In step 522, the MSC delivers a MAP protocol handover complete message to the SCSE. In step 523, the SCSE translates it into a GTP message, and delivers it to the MME. In step 524, the MME transmits a resource release command to the ENB to release the old LTE resources. Then the ENB releases the radio resources and sends a resource release complete message in response in step 525.

Now, a description will be made of an operation of the SCSE according to an embodiment of the present invention. First, the SCSE according to an embodiment of the present invention performs translation between a MAP message used for mobility management in the circuit network and a GTP message used for mobility management in the packet network. Second, the SCSE determines whether VCC call anchoring is performed on the handover-requesting UE, and sends an error message to the UE that has not yet undergone VCC call anchoring. Meanwhile, the SCSE performs interworking through a GTP-MAP translation work for the UE that has already undergone VCC call anchoring. Third, the SCSE delivers an INVITE message for generation of an access leg to the UE side using a circuit (CS) call routing number delivered from the MSC. Fourth, the SCSE delivers a handover prepare complete message to the UE at the time the update of the UE side's access leg and the bearer information of the receiving UE side has been completed.

Figure 6:
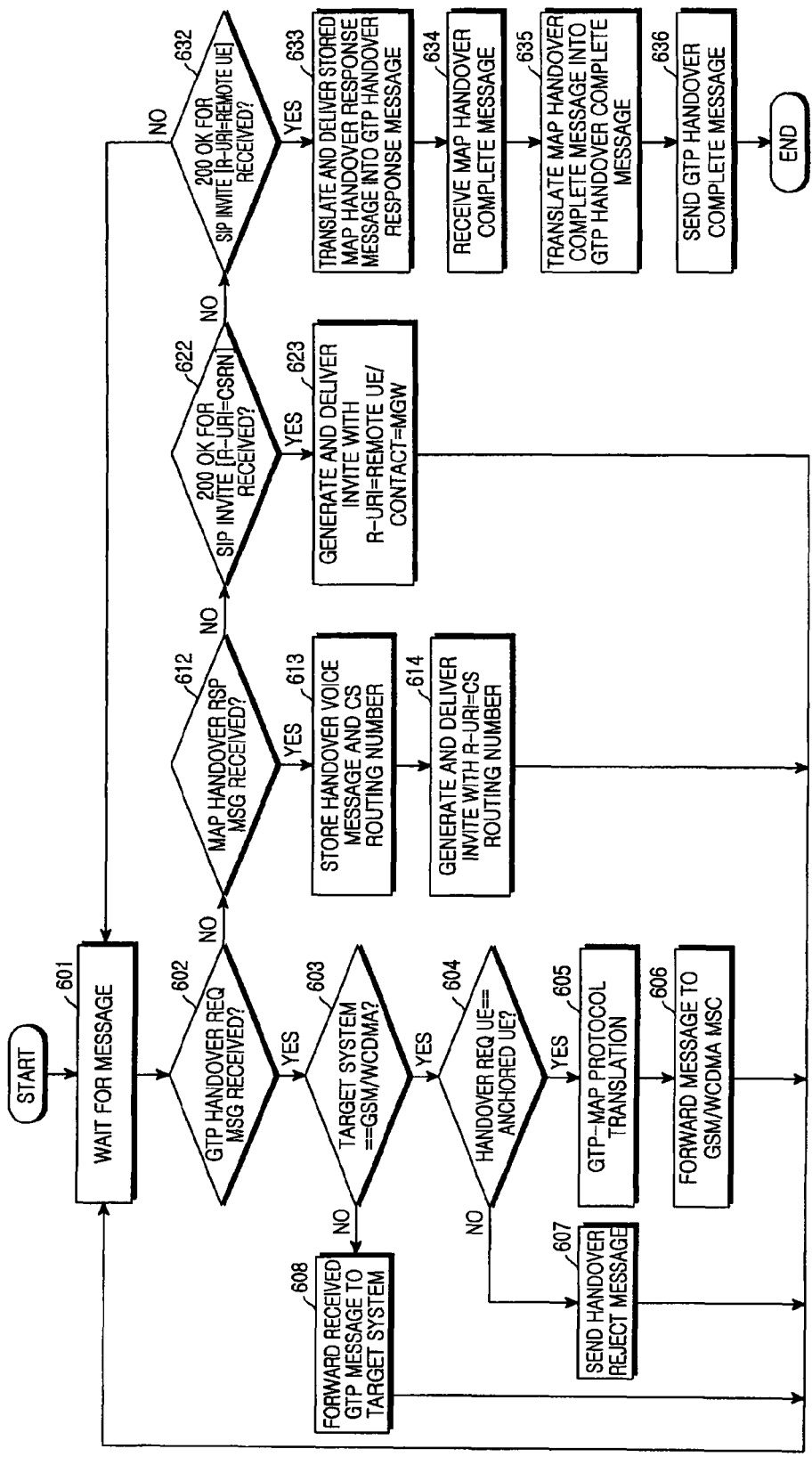
FIG. 6 is a signaling flowchart illustrating an operation of an SCSE according to an embodiment of the present invention.

FIG. 6 is a signaling flowchart illustrating an operation of an SCSE according to an embodiment of the present invention.

Referring to FIG. 6, in step 601, the SCSE is in an idle state where it is waiting for receipt of a message. In step 602, the SCSE determines if it has received a GTP handover request message delivered from the LTE network.

When the SCSE has received the GTP handover request message, the SCSE checks in step 603 whether the handover-requested target system is the GSM/WCDMA network. If it is determined that the received GTP handover request message is not the message for requesting handover to the GSM/WCDMA network, the SCSE intactly forwards the received GTP message to the network indicated by a cell ID in step 608, and returns to step 601. However, this process can be previously performed by the MME, and when this determination is made by the MME according to implementation, steps 603 and 608 can be omitted.

If it is determined that the received GTP handover request message is a message for requesting handover to the GSM/WCDMA network, the SCSE determines in step 604 the presence/absence of VCC call anchoring in the VCC application of the corresponding UE, to check if the corresponding message is a handover prepare request message to the CS domain of the GSM/WCDMA network or a prepare request message to the CS domain of the GSM/WCDMA network. When VCC call anchoring on the handover-requesting UE has already been performed, the SCSE receives a GTP handover request message in step 605, and translates it into a MAP handover request message. Thereafter, in step 606, the SCSE delivers the translated MAP handover request message to the MSC of the GSM/WCDMA network, and then returns to step 601.

However, when VCC call anchoring on the handover-requesting UE has not yet been performed even though the SCSE has received the GTP handover request message, the SCSE sends an error message such as a GTP handover reject or a handover failure in step 607, and then returns to step 601.

When the message received by the SCSE is not a GTP handover request message, the SCSE checks in step 612 if the received message is a MAP handover response message. Upon receipt of the MAP handover response message, the SCSE stores in step 613 the received response message and a CS routing number included in the response message. Thereafter, in step 614, the SCSE generates an INVITE message used for requesting a network-initiated call to the UE side to previously generate a CS bearer for the UE, and then delivers it to the UE side. In this case, Request-URI in the INVITE message is set as the CS routing number acquired in step 613, and calling party information of the INVITE message is set as information on a Remote UE. Thereafter, the SCSE returns to step 601.

When the message received by the SCSE is neither the GTP handover request message nor the MAP handover response message, the SCSE checks in step 622 whether the received message is a response message to the INVITE that it delivered to the UE side in step 614. If the received message is a response message to the INVITE message that it delivered in step 614, the SCSE generates, in step 623, an INVITE message used for updating a media bearer to the receiving UE side using the call access leg information of the UE side, included in the response message, i.e., using the address information of the MGW, and delivers it to the receiving UE. In this case, Request-URI of the INVITE is set as a receiving UE, and media contact information of SDP is set as an IP address of the MGW. Thereafter, the SCSE returns to step 601.

When the message received by the SCSE is neither the GTP handover request message, the MAP handover response message, nor the response message to the INVITE generated/delivered in step 614, the SCSE checks, in step 632, if the received message is a response message to the INVITE that it delivered to the receiving UE in step 621. Upon receipt of the response message to the INVITE message in step 621, the SCSE translates in step 633 the MAP handover response message stored in step 613 into a GTP handover response message, and delivers it to the MME. In this case, when step 633 has already been internally performed by the SCSE at a particular time after step 613, it can be omitted. In step 634, the SCSE delivers the GTP handover response message to the LTE MME, and then receives a MAP handover complete message from the MSC of the GSM/WCDMA network within a predetermined time. In step 635, the SCSE translates the received MAP handover complete message into a GTP handover complete message. In step 636, the SCSE delivers the GTP handover complete message to the MME. Thereafter, the SCSE returns to step 601. Even when it is determined in step 632 that the received message is not even a response message to the INVITE that the SCSE delivered to the receiving UE in step 621, the SCSE returns to step 601.

Figure 7:
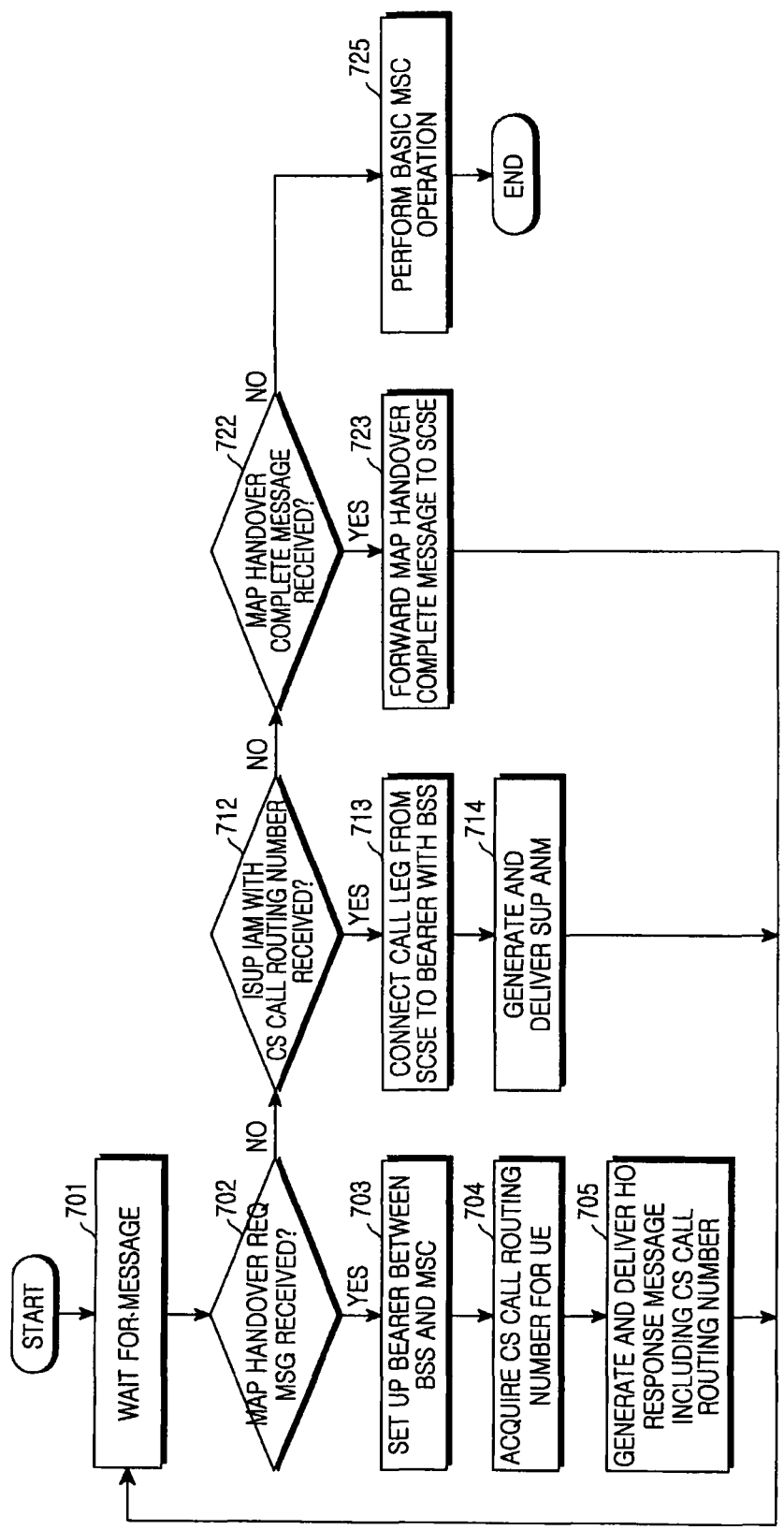
FIG. 7 is a signaling flowchart illustrating an operation of an MSC according to an embodiment of the present invention.

FIG. 7 illustrates an operation of an MSC according to an embodiment of the present invention.

Referring to FIG. 7, in step 701, the MSC is in the idle state where it waits for receipt of a message. In step 702, the MSC determines if it has received a MAP handover request message.

When the MSC has received the MAP handover request message, the MSC sets up a bearer to the handover requested UE through communication with a BSS in step 703. In step 704, the MSC assigns a CS call routing number necessary for delivering a CS call to the UE through communication with the VLR. In step 705, the MSC generates and sends a handover response message indicating the completion of the bearer setup to the handover-requesting UE and the preparation for handover, and then returns to step 701. In this case, the handover response message includes therein the CS call routing number acquired in step 704, and information on the set bearer.

However, when the received message is not the MAP handover request message, the MSC checks in step 712 whether it has received an ISUP IAM message with a CS call routing number included therein. Upon receipt of the ISUP IAM message with the CS call routing number included, the MSC performs mapping between the bearer information set in step 713 and the call leg requested by ISUP IAM. In this case, the MSC can determine whether it will operate as the legacy MSC or will operate as the MSC proposed by the present invention, by checking if the CS call routing number that it sent in the MAP handover response message in steps 704 and 705, is included in the IAM message. In step 714, the MSC generates and sends an ISUP ANM message, and then returns to step 701. In this case, as the legacy MSC receives a CC CONNECT message from the UE, the MSC internally generates an ISUP ANM message without any message from the UE, unlike in the operation of generating the ISUP ANM message.

When the message received by the MSC is neither the MAP handover request message nor the ISUP IAM message with a CS call routing number included therein, the MSC checks in step 722 whether the received message is a MAP handover complete message. Upon receipt of the MAP handover complete message, the MSC delivers the corresponding MAP handover complete message to the SCSE in step 723, and then returns to step 701.

When the message received by the MSC is neither the MAP handover request message, the ISUP IAM message with a CS call routing number included, nor the MAP handover complete message, the MSC determines in step 725 the types of messages according to the operation of the legacy MSC, performs a process according thereto, and then ends the operation.

EFFECT OF THE INVENTION

As is apparent from the foregoing description, the present invention inserts the SCSE between the MME and the MSC for handover signal translation, making it possible to translate signals for information exchange between two domains when handover has occurred between the LTE domain and the GSM/WCDMA CS domain. In addition, the present invention can anchor the voice call in the application level.

What is claimed is:

1. A method for performing handover between a packet switched call based on a packet switched network and a circuit switched call based on a circuit switched network, the method comprising:
  receiving, by a service continuity supporting entity (SCSE), a handover request message from a user equipment (UE) over the packet switched network;
  when the handover request message is a protocol message based on the packet switched network, checking, by the SCSE, if the handover-requesting UE is a UE that has been anchored in the SCSE;
  when the handover-requesting UE is not the UE that has been anchored in the SCSE, sending a handover reject message from the SCSE to the handover-requesting UE; and
  when the handover-requesting UE is the UE that has been anchored in the SCSE, translating, by the SCSE, the protocol message into a circuit message based on the circuit switched network, and then delivering the circuit message to the circuit switched network.

2. The method of claim 1, further comprising:
  receiving, by the SCSE, a response message to the delivered circuit message from the circuit switched network;
  storing, by the SCSE, the response message to the delivered circuit message and a circuit switched routing number included in the response message; and
  generating, by the SCSE, a first invite message for initiating a call using the circuit switched routing number, and delivering, by the SCSE, the first invite message to the handover-requesting UE.

3. The method of claim 2, further comprising:
  receiving, by the SCSE, a response message to the first invite message from the handover-requesting UE; and
  generating, by the SCSE, a second invite message for updating a media bearer using call access leg information of the handover-requesting UE included in the response message to the first invite message, and delivering, by the SCSE, the second invite message to a receiving UE.

4. The method of claim 3, further comprising:
  upon receiving a response message to the second invite message from the receiving UE, translating, by the SCSE, a response message to the circuit message into a protocol response message, and delivering, by the SCSE, the protocol response message to the packet switched network; and
  upon receiving a circuit handover complete message from the circuit switched network after the handover-requesting UE has performed handover from the packet switched network to the circuit switched network according to the protocol response message, translating, by the SCSE, the circuit handover complete message into a protocol handover complete message, and delivering, by the SCSE, the protocol handover complete message to the packet switched network.

5. The method of claim 1, further comprising:
  when the handover request message is a circuit message, setting up, by the SCSE, a radio bearer to the handover-requesting UE, and assigning, by the SCSE, to the handover-requesting UE a circuit switched call routing number for delivering the circuit switched call generating a handover response message including information on the radio bearer and the circuit switched call routing number, and transmitting, by the SCSE, the handover response message to the handover-requesting UE.

6. The method of claim 5, further comprising:
receiving, by the SCSE, an initial address message including the circuit switched call routing number;
performing, by the SCSE, mapping between a call leg included in the initial address message and the information on the radio bearer; and
generating, by the SCSE, a response message including information on the mapping, and transmitting, by the SCSE, the response message to the UE.

7. The method of claim 1, wherein the protocol message is a control plane message for setting up tunneling to the packet switched network.

8. The method of claim 1, wherein the circuit message is a mobile application part message.

9. The method of claim 1, further comprising:
checking, by the SCSE, information for checking a target network included in the handover request message, and delivering, by the SCSE, the handover request message to the checked target network.

10. An apparatus for performing handover between a packet switched call and a circuit switched call, the apparatus comprising:
a packet switched network;
a circuit switched network; and
a service continuity supporting entity (SCSE), connected between the packet switched network and the circuit switched network, configured to receive a handover request message from a user equipment (UE) over the packet switched network, configured to check if the handover-requesting UE is a UE that has been anchored in the SCSE when the handover request message is a protocol message based on the packet switched network, configured to send a handover reject message to the handover-requesting UE when the handover-requesting UE is not the UE that has been anchored in the SCSE, and when the handover-requesting UE is the UE that has been anchored in the SCSE, configured to translate the protocol message into a circuit message based on the circuit switched network, and configured to deliver the circuit message to the circuit switched network.

11. The apparatus of claim 10, wherein upon receiving a response message to the delivered circuit message, the SCSE stores the response message to the delivered circuit message and a circuit switched routing number included in the response message, generates a first invite message for initiating a call using the circuit switched routing number, and delivers the first invite message to the handover-requesting UE.

12. The apparatus of claim 11, wherein upon receiving a response message to the first invite message from the handover-requesting UE, the SCSE generates a second invite message for updating a media bearer using call access leg information of the handover-requesting UE included in the response message to the first invite message, and delivers the second invite message to a receiving UE.

13. The apparatus of claim 12, wherein upon receiving a response message to the second invite message from the receiving UE, the SCSE translates a response message to the circuit message into a protocol response message, and delivers the protocol response message to the packet switched network;
wherein upon receiving a circuit handover complete message from the circuit switched network after performing handover from the packet switched network to the circuit switched network according to the protocol response message, the handover-requesting UE translates the circuit handover complete message into a protocol handover complete message, and delivers the protocol handover complete message to the packet switched network.

14. The apparatus of claim 10, wherein the circuit switched network comprises a Mobile Service switching Center (MSC) for receiving the circuit message from the SCSE, setting up a radio bearer to the handover-requesting UE, assigning a circuit switched call routing number for delivering the circuit switched call to the handover-requesting UE, generating a handover response message including the set bearer information and the routing number, and transmitting the handover response message to the SCSE.

15. The apparatus of claim 10, wherein the protocol message is a control plane message for setting up tunneling to the packet switched network.

16. The apparatus of claim 10, wherein the circuit message is a mobile application part message.

17. The apparatus of claim 10, wherein the SCSE checks information for checking a target network included in the handover request message, and delivers the handover request message to the checked corresponding target network.

18. A system for performing handover between a packet switched call based on a packet switched network and a circuit switched call based on a circuit switched network, the system comprising:
a user equipment (UE), connected to a particular cell of the packet switched network, configured to perform measurement on at least one cell based on the circuit switched network neighboring the particular cell;
the packet switched network including, an enhanced node B (eNB) of the particular cell, configured to check a measurement report received from the UE to determine whether to perform handover, and a mobile management entity configured to check information on a target network through a handover request message transmitted from the eNB, and configured to transmit a protocol-based handover request message to a service continuity supporting entity (SCSE);
the SCSE configured to receive the protocol-based handover request message, configured to check if the target network is a circuit switched network, configured to check if the UE has been anchored in the SCSE, sending a handover reject message to the UE when the UE has not been anchored in the SCSE, and when the UE has been anchored in the SCSE, and configured to translate the protocol-based handover request message into a circuit-based handover request message; and
the circuit switched network including a mobile service cg enter (MSC) configured to receive a circuit-based handover request message delivered from the SCSE, configured to assign a particular cell of the circuit switched network, and configured to set up a radio bearer to the assigned particular cell, completing handover.

19. The system of claim 18, wherein the UE is a UE supporting a voice call of the packet switched network and a voice call of the circuit switched network.

20. The system of claim 18, wherein the SCSE manages call information for each of the packet switched call and the circuit switched call, and UE information of a generated call.

21. The system of claim 18, wherein the protocol-based handover request message is a protocol-based tunneling setup message (GPRS tunnel protocol control message) of a control plane, used for handover in the packet switched network.

22. The system of claim 18, wherein the circuit-based handover request message is a mobile application part message used for handover in the circuit switched network.

* * * * *